United States Patent
Shanthamallu et al.

(10) Patent No.: US 11,526,765 B2
(45) Date of Patent: Dec. 13, 2022

(54) SYSTEMS AND METHODS FOR A SUPRA-FUSION GRAPH ATTENTION MODEL FOR MULTI-LAYERED EMBEDDINGS AND DEEP LEARNING APPLICATIONS

(71) Applicant: Arizona Board of Regents on Behalf of Arizona State University, Tempe, AZ (US)

(72) Inventors: Uday Shanthamallu, Tempe, AZ (US); Jayaraman Thiagarajan, Dublin, CA (US); Andreas Spanias, Tempe, AZ (US); Huan Song, Tempe, AZ (US)

(73) Assignees: Arizona Board of Regents on Behalf of Arizona State University, Tempe, AZ (US); Lawrence Livermore National Security, LLC, Livermore, CA (US)

( * ) Notice: Subject to any disclaimer, the term of this patent is extended or adjusted under 35 U.S.C. 154(b) by 485 days.

(21) Appl. No.: 16/740,072

(22) Filed: Jan. 10, 2020

(65) Prior Publication Data
US 2020/0226472 A1 Jul. 16, 2020

Related U.S. Application Data

(60) Provisional application No. 62/790,830, filed on Jan. 10, 2019.

(51) Int. Cl.
*G06N 3/08* (2006.01)
*G06F 16/901* (2019.01)
*G06F 17/16* (2006.01)
*G06N 3/04* (2006.01)

(52) U.S. Cl.
CPC ......... *G06N 3/084* (2013.01); *G06F 16/9024* (2019.01); *G06F 17/16* (2013.01); *G06N 3/04* (2013.01)

(58) Field of Classification Search
CPC ...... G06N 3/084; G06F 16/9024; G06F 17/16
See application file for complete search history.

(56) References Cited

U.S. PATENT DOCUMENTS

| | | | |
|---|---|---|---|
| 9,461,676 B2 | 10/2016 | Santucci et al. | |
| 9,507,011 B2 | 11/2016 | Zhang et al. | |
| 9,710,916 B2 | 7/2017 | Thiagarajan et al. | |
| 9,779,497 B2 | 10/2017 | Thiagarajan et al. | |
| 9,875,428 B2 | 1/2018 | Ramamurthy et al. | |

(Continued)

FOREIGN PATENT DOCUMENTS

| | | |
|---|---|---|
| WO | 2014144306 A1 | 9/2014 |
| WO | 2014144306 A9 | 9/2014 |

(Continued)

OTHER PUBLICATIONS

Chen et al, "Multilayer Spectral Graph Clustering via Convex Layer Aggregation: Theory and Algorithm", 2017, IEEE, vol. 3, 15 pages.*
Lee et al, "Deep Graph Attention Model", 2018, Association for the Advancement of Artificial Intelligence, 9 pages.*

(Continued)

Primary Examiner — Loc Tran
(74) Attorney, Agent, or Firm — Polsinelli PC

(57) ABSTRACT

Various embodiments of systems and methods for attention models with random features for multi-layered graph embeddings are disclosed.

4 Claims, 4 Drawing Sheets
(3 of 4 Drawing Sheet(s) Filed in Color)

(56) References Cited

U.S. PATENT DOCUMENTS

| | | | |
|---|---|---|---|
| 10,028,085 | B2 | 7/2018 | Zhang et al. |
| 10,387,751 | B2 | 8/2019 | Braun et al. |
| 10,440,553 | B2 | 10/2019 | Zhang et al. |
| 2019/0108444 | A1 | 4/2019 | Song et al. |
| 2019/0384983 | A1 | 12/2019 | Katoch et al. |
| 2020/0236402 | A1 | 7/2020 | Spanias et al. |
| 2020/0274484 | A1 | 8/2020 | Narayanawamy et al. |
| 2020/0358396 | A1 | 11/2020 | Rao et al. |

FOREIGN PATENT DOCUMENTS

| | | |
|---|---|---|
| WO | 2014152919 A1 | 9/2014 |
| WO | 2014152929 A1 | 9/2014 |

OTHER PUBLICATIONS

U.S. Appl. No. 16/901,961, filed Jun. 15, 2020, Jayasuriya et al.
Ahmed et al., "Distributed large-scale natural graph factorization," in Proceedings of the 22nd international conference on World Wide Web. ACM, 2013, pp. 37-48.
Ahmed et al., "Weighted transformer network for machine translation," CoRR, vol. abs/1711.02132, 2017.
Barone et al., "Deep architectures for neural machine translation," arXiv preprint arXiv:1707.07631,2017.
Bazzi et al., "Community detection in temporal multilayer networks, with an application to correlation networks," Multiscale Modeling & Simulation, vol. 14, No. 1, pp. 1-41, 2016.
Boden et al., "Mining coherent subgraphs in multi-layer graphs with edge labels," in Proceedings of the 18th ACM SIGKDD international conference on Knowledge discovery and data mining. ACM, 2012, pp. 1258-1266.
Bruna et al., "Spectral networks and locally connected networks on graphs," arXiv preprint arXiv:1312.6203, 2013.
Chen et al., "Community detection via maximization of modularity and its variants," IEEE Transactions on Computational Social Systems, vol. 1, No. 1, pp. 46-65, 2014.
Chen et al., "Multilayer spectral graph clustering via convex layer aggregation: Theory and algorithms," IEEE Transactions on Signal and Information Processing over Networks, vol. 3, No. 3, pp. 553-567, 2017.
Coleman, et al., The diffusion of an innovation among physicians, Sociometry, vol. 20, No. 4, pp. 253-270, 1957.
Defferrard et al., "Convolutional neural networks on graphs with fast localized spectral filtering," in Advances in Neural Information Processing Systems, 2016, pp. 3844-3852.
Dong et al., "Clustering on multi-layer graphs via subspace analysis on grassman manifolds," IEEE Transactions on signal processing, vol. 62, No. 4, pp. 905-918, 2014.
Dong et al., "Clustering with multi-layer graphs: A spectral perspective," IEEE Transactions on Signal Processing, vol. 60, No. 11, pp. 5820-5831, 2012.
Dua, et al., UCI machine learning repository, 2017.
Duvenaud et al., "Convolutional networks on graphs for learning molecular fingerprints," in Advances in neural information processing systems, 2015, pp. 2224-2232.
Eagle et al., "Reality mining: sensingcomplex social systems," Personal and ubiquitous computing, vol. 10, No. 4, pp. 255-268, 2006.
Fornito et al., "Graph analysis of the human connectome: promise, progress, and pitfalls," Neuroimage, vol. 80, pp. 426-444, 2013.
Frasconi et al., "A general framework for adaptive processing of data structures," IEEE transactions on Neural Networks, vol. 9, No. 5, pp. 768-786, 1998.
Gligorijevic et al., "Fusion and community detection in multi-layer graphs," in Pattern Recognition (ICPR), 2016 23rd International Conference on. IEEE, 2016, pp. 1327-1332.
Gori et al., "A new model for learning in graph domains," in Neural Networks, 2005. IJCNN'05. Proceedings. 2005 IEEE International Joint Conference on. IEEE, 2005, vol. 2, pp. 729-734.
Grover et al., "node2vec: Scalable feature learning for networks," in Proceedings of the 22nd ACM SIGKDD International Conference on Knowledge Discovery and Data Mining. ACM, 2016, pp. 855-864.
Harris, Distributional Structure, 1954.
Henaff et al., "Deep convolutional networks on graph-structured data," arXiv preprint arXiv:1506.05163, 2015.
Kim et al., "Community detection in multi-layer graphs: A survey," ACM SIGMOD Record, vol. 44, No. 3, pp. 37-48, 2015.
Kim et al., "Differential flattening A novel framework for community detection in multi-layer graphs," ACM Transactions on Intelligent Systems and Technology (TIST), vol. 8, No. 2, pp. 27, 2017.
Kipf et al., "Semi-supervised classification with graph convolutional networks," arXiv preprint arXiv:1609.02907, 2016.
Li et al., "Influential node detection in implicit social networks using multi-task gaussian copula models," in NIPS 2016 Time Series Workshop, 2017, pp. 27-37.
Li et al., "Multi-layered network embedding," in Proceedings of the 2018 SIAM International Conference on Data Mining. SIAM 2018, pp. 648-692.
Liu, et al., Principled multilayer network embedding, in 2017 IKEEE International Conference on Data Mining Workshops (ICDMW), IEEE, 2017, pp. 134-141.
Mikolov et al., "Distributed representations of words and phrases and their compositionality," in Advances in neural information processing systems, 2013, pp. 3111-3119.
Mucha et al., "Community structure in time-dependent, multiscale, and multiplex networks," science, vol. 328, No. 5980, pp. 876-878, 2010.
Newman, "Finding community structure in networks using the eigenvectors of matrices," Physical review E, vol. 74, No. 3, pp. 036104, 2006.
Ng et al., "On spectral clustering: Analysis and an algorithm," in Advances in neural information processing systems, 2002, pp. 849-856.
Niepert et al., "Learning convolutional neural networks for graphs," in International conference on machine learning, 2016, pp. 2014-2023.
Papalexakis et al., "Do more views of a graph help? community detection and clustering in multi-graphs," in Information fusion (FUSION), 2013 16th international conference on. IEEE, 2013, pp. 899-905.
Perozzi et al., "Deepwalk: Online learning of social representations," in Proceedings of the 20th ACM SIGKDD international conference on Knowledge discovery and data mining. ACM, 2014, pp. 701-710.
Rao et al., "Collaborative filtering with graph information: Consistency and scalable methods," in Advances in neural information processing systems, 2015, pp. 2107-2115.
Scarselli et al., "The graph neural network model," IEEE Transactions on Neural Networks, vol. 20, No. 1, pp. 61-80, 2009.
Schlimmer, "Concept acquisition through representational adjustment," 1987.
Shuman et al., "The emerging field of signal processing on graphs: Extending high-dimensional data analysis to networks and other irregular domains," IEEE Signal Processing Magazine, vol. 30, No. 3, pp. 83-98, 2013.
Song et al., "Attend and diagnose: Clinical time series analysis using attention models," arXiv preprint arXiv:1711.03905, 2017.
Song et al., "Improved community detection using deep embeddings from multi-layer graphs," arXiv preprint, 2018.
Sperduti et al., "Supervised neural networks for the classification of structures," IEEE Transactions on Neural Networks, vol. 8, No. 3, pp. 714-735, 1997.
Tagarelli et al., "Ensemble based community detection in multilayer networks," Data Mining and Knowledge Discovery, vol. 31, No. 5, pp. 1506-1543, 2017.
Tang et al., "Clustering with multiple graphs," in Data Mining, 2009. ICDM'09. Ninth IEEE International Conference on. IEEE, 2009, pp. 1016-1021.
Tang, et al., Line: Large-scale information network embedding, in Proceedings of the 24th International Conference on World Wide Web, 2015, pp. 1067-1077.

(56) References Cited

OTHER PUBLICATIONS

Thiagarajan et al., "Robust local scaling using conditional quantiles of graph similarities," in Data Mining Workshops (ICDMW), 2016 IEEE 16th International Conference on. IEEE, 2016, pp. 762-769.
Vaswani et al., "Attention is all you need," in Advances in Neural Information Processing Systems, 2017, pp. 5998-6008.
Velickovic et al., "Graph attention networks," arXiv preprint arXiv:1710.10903, 2017.
Vickers et al., "Representing classroom social structure," Victoria Institute of Secondary Education, Melbourne, 1981.
Wang, et al., Learning on big graph: Label inference and regularization with anchor hierarchy, IEEE transactions on knowledge and data engineering, vol. 29, No. 5, pp. 1101-1114, 2017.
Wang, et al., Multi-modal graph-based reranking for web image search, IEEE Transactions on Image Processing, vol. 21, No. 11, pp. 4649-4661, 2012.
Yang et al., "Improving neural machine translation with conditional sequence generative adversarial nets," arXiv preprint arXiv:1703.04887, 2017.
Yang et al., "Modularity based community detection with deep learning.," in IJCAI, 2016, pp. 2252-2258.
Zeng et al., "Coherent closed quasi-clique discovery from large dense graph databases," in Proceedings of the 12th ACM SIGKDD international conference on Knowledge discovery and data mining. ACM, 2006, pp. 797-802.
Zhang et al., "Link Prediction Based on Graph Neural Networks," 2018.
Zhang, et al., Scalable multiplex network embedding, in IJCAI, 2018, pp. 3082-2088.

\* cited by examiner

SYSTEMS AND METHODS FOR A SUPRA-FUSION GRAPH ATTENTION MODEL FOR MULTI-LAYERED EMBEDDINGS AND DEEP LEARNING APPLICATIONS

CROSS-REFERENCE TO RELATED APPLICATIONS

This is a non-provisional application that claims benefit to U.S. provisional application Ser. No. 62/790,830 filed on Jan. 10, 2019, which is herein incorporated by reference in its entirety.

GOVERNMENT SUPPORT

This invention was made with government support under 1540040 awarded by the National Science Foundation. The government has certain rights in the invention.

FIELD

The present disclosure generally relates to attention models; and in particular to, systems and methods for attention models with random features for multi-layered graph embeddings.

BACKGROUND

The prevalence of relational data in several real-world applications, e.g. social network analysis, recommendation systems and neurological modeling has led to crucial advances in machine learning techniques for graph-structured data. This encompasses a wide-range of formulations to mine and gather insights from complex network datasets—node classification, link prediction, community detection, influential node selection and many others. Despite the variability in these formulations, a recurring idea that appears in almost all of these approaches is to obtain embeddings for nodes in a graph, prior to carrying out the downstream learning task. In the simplest form, the adjacency matrix indicating the connectivity can be treated as naïve embeddings for the nodes. However, it is well known that such cursed, high-dimensional representations can be ineffective for the subsequent learning. Hence, there has been a long-standing interest in constructing low-dimensional embeddings that can best represent the network topology.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1:
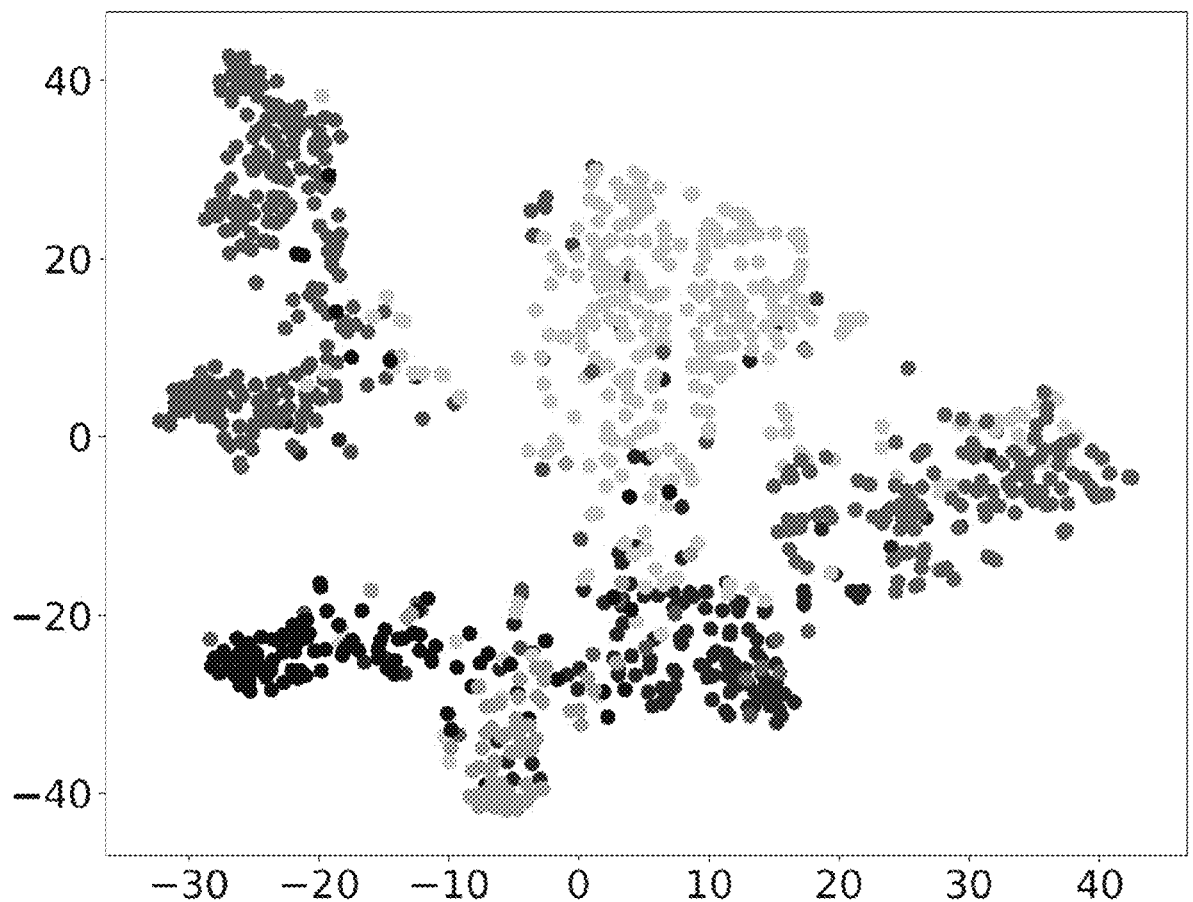
FIG. 1 is a graphical representation of two-dimensional visualization of the embeddings for the single-layer Cora dataset obtained using the proposed weighted attention mechanism.

The present disclosure relates to Graph Attention Models for Multi-layered Embeddings (GrAMME) for constructing multi-layered graph embeddings using attention models. In contrast to the existing literature on community detection, the present disclosure performs feature learning in an end-to-end fashion with the node classification objective, and shows that the present system is superior to employing separate stages of network embedding (e.g. DeepWalk) and classifier design. First, even in datasets that do not have explicit node attributes, using random features is a highly effective choice. Second, it is shown that attention models provide a powerful framework for modeling inter-layer dependencies, and can easily scale to a large number of layers. To this end, an architecture (referred to herein as "the system" or "GrAMME-Fusion") is developed that employs deep attention models for semi-supervised learning. This architecture builds layer-specific attention models and subsequently obtains consensus representations through fusion for label prediction. Using several benchmark multi-layered graph datasets, the present disclosure demonstrate the effectiveness of random features and show that the proposed approach significantly outperforms state-of-the-art network embedding strategies such as DeepWalk.

Preliminaries

TABLE 1

Preliminary Definitions

| Notation | Definition |
|---|---|
| $\mathcal{V}$ | Set of nodes in a graph |
| $\mathcal{E}$ | Set of edges in a graph |
| N | Number of nodes, $|\mathcal{V}|$ |
| L | Number of layers in a muti-layered graph |
| $\mathcal{E}^{(l)}$ | Edge set of $l^{th}$ layer of a multi-layered graph |
| $M^{(l)}$ | Cardinality of the edge set $\mathcal{E}^{(l)}$ |
| $x_i$ | Attributes for node i |
| X | Set of attributes for all N nodes, $[x_1, x_2, \ldots, x_N]^T$ |
| $z_i$ | Embedding for the $i^{th}$ node |
| Z | Set of embeddings for all N nodes, $[z_1, z_2, \ldots, z_N]^T$ |
| D | Dimensionality of node attributes |
| d | Embedding size |
| $y_i$ | Label for node i |
| W | Learnable weight matrix for the linear transformation |

TABLE 1-continued

Preliminary Definitions

| Notation | Definition |
|---|---|
| A | Parameters of the attention function |
| $e_{ij}$ | Attention coefficient for edge between i & j |
| $\alpha_{ij}$ | Normalized attention coefficient for edge between i & j |
| H | Number of attention heads |
| $\beta_h$ | Scaling factor for attention head h |
| K | Number of supra-fusion heads |
| $\gamma^{(k)}$ | Scaling factor for the $k^{th}$ supra-fusion head |

Definitions: A single-layered undirected, unweighted graph is represented by $\mathcal{G} = (\mathcal{V}, \mathcal{E})$, where $\mathcal{V}$ denotes the set of nodes with cardinality $|\mathcal{V}|=N$, and $\mathcal{E}$ denotes the set of edges. A multi-layered graph is represented using a set of L interdependent graphs $\mathcal{G}^{(l)} = (\mathcal{V}^{(l)}, \mathcal{E}^{(l)})$, for $l=1, \ldots, L$, where there exists a node mapping between every pair of layers to indicate which vertices in one graph correspond to vertices in the other. In the present system, it is assumed that $\mathcal{V}^{(l)}$ from all layers contain the same set of nodes, while the edge sets $\mathcal{E}^{(l)}$ (each of cardinality $M^{(l)}$) are assumed to be different. In addition to the network structure, each node is endowed with a set of attributes, $x_i \in \mathbb{R}^D$, $i \in [N]$, which can be used to construct latent representations, $Z \in \mathbb{R}^{N \times d}$, where d is the desired number of latent dimensions. Finally, each node is associated with a label $y_i$, which contains one of the C predefined categories.

Deep Network Embeddings

The scalability challenge of factorization techniques has motivated the use of deep learning methods to obtain node embeddings. Consider a simple metric walk $W_t$ in step t, which is rooted at the vertex $v_i$. The transition probability between the nodes $v_i$ and $v_j$ can be expressed as $$P(W_{t+1}=v_j | W_t=v_i) = h(\|z_i - z_j\|_2 / \sigma) \quad (1)$$

$\|z_i - z_j\|_2$ indicates the similarity metric between the two vertices in the latent space to be recovered and h is a linking function that connects the vertex similarity to the actual co-occurrence probability. With appropriate choice of the walk length, the true metric can be recovered accurately from the co-occurrence statistics inferred using random walks. Furthermore, it is important to note that the frequency in which vertices appear in the short random walks follows a power-law distribution, similar to words in natural language. Given a length-S sequence of words, $(w_0 | w_1, \ldots, w_{S-1})$, where $w_s$ denotes a word in the vocabulary, neural word embeddings attempt to obtain vector spaces that can recover the likelihood of observing a word given its context, i.e., $P(w_s | w_0, w_1, \ldots, w_{s-1})$ over all sequences. Extending this idea to the case of graphs, a random walk on the nodes, starting from node $v_i$, produces the sequence analogous to sentences in language data.

Graph Attention Models

In this section, the recently proposed graph attention model, a variant of which is utilized in this paper to construct multi-layered graph embeddings will be discussed. Attention mechanism is a widely-adopted strategy in sequence-to-sequence modeling tasks, wherein a parameterized function is used to determine relevant parts of the input to focus on, in order to make decisions. These important components have been subsequently utilized in a variety of NLP tasks and clinical modeling.

One useful interpretation of self-attention is that it implicitly induces a graph structure for a given sequence, where the nodes are time-steps and the edges indicate temporal dependencies. Instead of a single attention graph, multiple graphs corresponding to the different attention heads can be considered, each of which can be interpreted to encode different types of edges and hence can provide complementary information about different types of dependencies. In addition to supporting variabilities in neighborhood sizes and improving the model capacity, graph attention models are computationally more efficient than other graph convolutional networks. This disclosure includes a method to utilize attention mechanisms to model multi-layered graphs.

Formulation: A head in the graph attention layer learns a latent representation for each node by aggregating the features from its neighbors. More specifically, the feature at a node is computed as the weighted combination of features from its neighbors, where the weights are obtained using the attention function. Following notations, each node $v_i$ is endowed with a D-dimensional attribute vector $x_i$, and hence the input to graph attention layer is denoted by the set of attributes $\{x_1, x_2, \ldots, x_n\}$. The attention layer subsequently produces d-dimensional latent representations $Z = \{z_1, z_2, \ldots, z_n\}$.

An attention head is constructed as follows: First, a linear transformation is applied to the features at each node, using a shared and trainable weight matrix $W \in \mathbb{R}^{d \times D}$, thus producing intermediate representations, $$\tilde{X} = XW^T \quad (2)$$

Subsequently, a scalar dot-product attention function is utilized to determine attention weights for every edge in the graph, based on features from the incident neighbors. Formally, the attention weight for the edge $e_{ij}$ connecting the nodes $v_i$ and $v_j$ is computed as $$e_{ij} = \langle A, \tilde{x}_i \| \tilde{x}_j \rangle \quad (3)$$

where $A \in \mathbb{R}^{2d \times 1}$ denotes the parameters of the attention function, and $\|$ represents concatenation of features from nodes $v_i$ and $v_j$ respectively. The attention weights $e_{ij}$ are computed with respect to every node in the neighborhood of $v_i$, i.e., for $v_j \in \mathcal{N}_i \uparrow \{i\}$, where $\mathcal{N}_i$ represents the neighborhood of $v_i$. Note that, the present system includes the self-edge for every node while implementing the attention function. The weights are then normalized across all neighboring nodes using a softmax function, thus producing the normalized attention coefficients.

$$\alpha_{ij} = \text{softmax}(e_{ij}) \quad (4)$$

Finally, the normalized attention coefficients are used to compute the latent representation at each node, through a weighted combination of the node features. Note that, a non-linearity function is also utilized at the end to improve the approximation.

$$z_i = \sigma\left(\sum_{j \in \mathcal{N}_i \cup [i]} \alpha_{ij} \tilde{x}_j\right) \quad (5)$$

An important observation is that the attention weights are not required to be symmetric. For example, if a node $v_i$ has a strong influence on node $v_j$, it does not imply that node $v_j$ also has a strong influence on $v_i$ and hence $e_{ij} \neq e_{ji}$. The operations from equations (2) to (5) constitute a single head. While this simple parameterization enables effective modeling of relationships in a graph while learning latent features, the modeling capacity can be significantly improved by considering multiple attention heads. The output latent representations from the different heads can be aggregated using either concatenation or averaging operations.

Proposed Approach

In this section, the present approach is discussed for constructing multi-layered graph embeddings in semi-supervised learning problems. Before presenting the algorithmic details, it is necessary to describe the attention mechanism used in the present approach which utilizes a weighting function to deal with multiple attention heads. Next, the use of randomized node attributes for effective feature learning is motivated. As described in the multi-layered graphs, the relationships between nodes are encoded using multiple edge sets. Consequently, while applying attention models for multi-layered graphs, a node $v_i$ in layer l needs to update its hidden state using not only knowledge from its neighborhood in that layer, but also the shared information from other layers. Note, it is assumed no prior knowledge on the dependency structure, and solely rely on attention mechanisms to uncover the structure.

Weighted Attention Mechanism

From the discussion herein, it is clear that latent representations from the multiple attention heads can provide complementary information about the node relationships. Hence, it is crucial to utilize that information to produce reliable embeddings for label propagation. When simple concatenation is used, an attention layer results in features of the dimension H×d, where H is the number of attention heads. While this has been effective, one can gain improvements by performing a weighted combination of the attention heads, such that different heads can be assigned varying levels of importance. For a node $v_i$, denoting the representations from the different heads as $z_i^1 \ldots z_i^H$, the proposed weighted attention combines these representations as follows:

$$\hat{z}_i = \sum_{h=1}^{H} \beta_h z_i^h, \quad (6)$$

where $\beta_h$ denotes the scaling factor for head h and are trainable during the optimization. Note that, the scaling factors are shared across all nodes and they are constrained to be non-negative. Optionally, one can introduce the constraint $\Sigma_h \beta_h = 1$ into the formulation. However, it is observed that its inclusion did not result in significant performance improvements in conducted experiments. Given a set of attention heads for a single graph layer, this weighting mechanism is referred to as a fusion head.

Interestingly, it was found that this modified attention mechanism produces robust embeddings, when compared to the graph attention layer previously proposed, even with lesser number of attention heads. For example, considering Cora, a single-layered graph dataset, containing 2708 nodes (publications) belonging to one of 7 classes. With the regular graph attention model, comprised of two attention layers with 8 heads each, a test accuracy of 81.5% (140 training nodes) was obtained. In contrast, the present weighted attention, even with just 2 heads, produces state-of-the-art accuracy of 82.7%. Naturally, this leads to significant reduction in the computational complexity of the present architecture, which is more beneficial when dealing with multi-layered graphs. FIG. 1 illustrates a two-dimensional visualization (obtained using t-SNE) of the embeddings from the present graph attention model.

Using Randomized Node Attributes

With graph attention models, it is required to have access to node attributes (or features), which are then used to obtain the latent representations. However, in practice, multi-layered graph datasets are often comprised of only the edge sets, without any additional information. Consequently, in existing graph inferencing approaches (e.g. community detection), it is typical to adopt an unsupervised network embedding strategy, where the objective is to ensure that the learned representations preserve the network topology (i.e. neighborhoods). However, such an approach is not optimal for semi-supervised learning tasks, since the model parameters can be more effectively tuned using the task-specific objective, in an end-to-end fashion. In order to address this challenge, the present system employs a randomized initialization strategy for creating node attributes. Interestingly, random initialization has been highly successful in creating word representations for NLP tasks, and in many scenarios its performance matches or even surpasses pre-trained word embeddings. With this initialization, the graph attention model can be used to obtain latent representations that maximally support label propagation in the input graph. Unlike fully supervised learning approaches, the embeddings for nodes that belong to the same class can still be vastly different, since the attention model fine-tunes the initial embeddings using only the locally connected neighbors. As will be shown in the experiments, this simple initialization is effective, and the present system's end-to-end training approach produces superior performance.

Approach Description: GrAMME-Fusion

Figure 2:
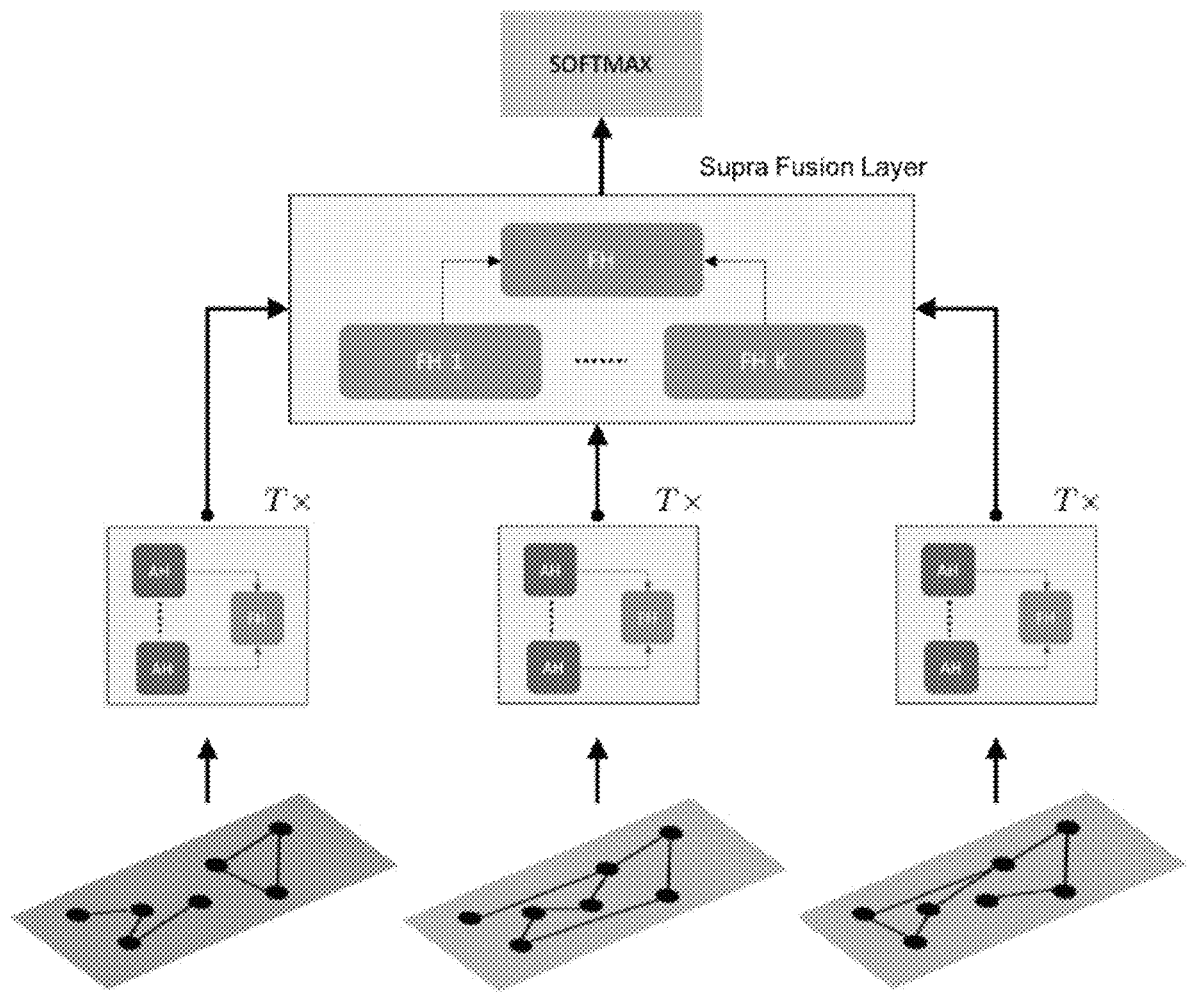
FIG. 2 is a simplified illustration showing the GrAMME-Fusion architecture for obtaining multi-layered graph embeddings with attention models applied to the Supra Graph, constructed by introducing virtual edges between layers.

GrAMME-Fusion builds layer-wise attention models, and introduces a supra fusion layer that exploits inter-layer dependencies using only fusion heads. As described above, a fusion head computes simple weighted combination and hence is computationally cheap. For simplicity, it is assumed that the same attention model architecture is used for every layer, although that is not required. This approach is motivated from an observation that attention heads in the present feature learning architecture, and the different layers in a multi-layered graph both provide complementary views of the same data, and hence they can be handled similarly using fusion heads. FIG. 2 illustrates the GrAMME-Fusion architecture.

Initially, each graph layer/is processed using an attention model comprised of T stacked graph attention layers, each of which implements H attention heads and a fusion head, to construct layer-specific latent representations. Though the processing of the L layers can be parallelized, the computational complexity is dominated by the number of heads H in each model. Next, a supra fusion layer is constructed which is designed extensively using fusion heads in order to parameterize the dependencies between layers. In other words, the present system creates K fusion heads with scaling factors $\gamma^{(k)} \in \mathbb{R}^L, \forall k=1 \ldots K$, in order to combine the representations from the L layer-specific attention models. Note that multiple fusion heads are used to allow different parameterizations for assigning importance to each of the layers. This is conceptually similar to using multiple attention heads. Finally, an overall fusion head is used, with scaling factors $\kappa \in \mathbb{R}^K$, to obtain a consensus representation from the multiple fusion heads. One can optionally introduce an additional feed-forward layer prior to employing the overall fusion to improve the model capacity. The output from the supra fusion layer is used to make the prediction through a fully-connected layer with softmax activation. The interplay between the parameters H (layer-wise attention heads) and K (fusion heads in the supra fusion layer) controls the effectiveness and complexity of this approach.

TABLE 2

Summary of the datasets used in empirical studies.

| Dataset | Type | # Nodes | # Layers | # Total edges | # Classes |
|---|---|---|---|---|---|
| Vickers-Chan | Classroom social structure | 29 | 3 | 740 | 2 |
| Congress Votes | Bill voting structure among senators | 435 | 4 | 358,338 | 2 |
| Leskovec-Ng | Academic collaboration | 191 | 4 | 1,836 | 2 |
| Reinnovation | Global innovation index similarities | 145 | 12 | 18,648 | 3 |
| Mammography | Mammographic Masses | 961 | 5 | 1,979,115 | 2 |
| Balance Scale | Psychological assessment | 625 | 4 | 312,500 | 3 |

Empirical Studies

In this section, the proposed approaches are evaluated by performing semi-supervised learning with benchmark multi-layered graph datasets. The experiments study the behavior of the approaches detailed in this disclosure, with varying amounts of labeled nodes, and cross-validated with different train-test splits. Though the proposed approaches can be utilized for inductive learning, the experiments were restricted to transductive tasks. For each dataset and experiment, labeled nodes are selected uniformly at random, while fixing the amount of labeled nodes. The datasets considered for the study are first described, and then briefly discuss the baseline techniques based on deep network embeddings.

Datasets

The multi-layered graph datasets used for evaluation will now be described in detail. A summary of the datasets can be found in Table 2.

Vickers-Chan: The Vickers-Chan dataset represents the social structure of students from a school in Victoria, Australia. Each node represents a student studying in 7th grade, and the three graph layers are constructed based on student responses for the following three criteria: (i) who did they get along with in the class, (ii) who are their best friends in the class, and (iii) who do they prefer to work with. The dataset is comprised of 29 nodes and their gender value is used as the label in the present learning formulation.

Congress Votes: The Congress votes dataset is obtained from the 1984 United States Congressional Voting Records Database. This includes votes from every congressman from the U.S. House of representatives for 4 different bills, which results in a 4-layered graph. The dataset is comprised of 435 nodes and they are labeled as either democrats or republicans. For every layer, the present system establishes an edge between two nodes in the corresponding layer, if those two congressmen voted similarly ("yes" or "no").

Leskovec-Ng: This dataset is a temporal collaboration network of professors Jure Leskovec and Andrew Ng. The 20 year co-authorship information is partitioned into 5-year intervals, in order to construct a 4-layered graph. In any layer, two researchers are connected by an edge if they co-authored at least one paper in the considered 5-year interval. Each researcher is labeled as affiliated to either Leskovec's or Ng's group.

Reinnovation: This dataset describes the Global Innovation Index for 144 countries, which form the nodes of the graph. For each node, the label represents the development level of that corresponding country. There are 3 levels of development, thus representing the 3 classes. Each layer in a graph is constructed based on similarities between countries in different sectors. The sectors include infrastructure, institutions, labor market, financial market etc. This graphs contains 12-layers in total.

Mammography: This dataset contains information about mammographic mass lesions from 961 subjects. Different attributes are considered, namely the BI-RADS assessment, subject age, shape, margin, and density of the lesion, in order to construct the different layers of the graph. This data is quite challenging due to the presence of 2 million edges. Conventional network embedding techniques that rely on sparsity of the graphs can be particularly ineffective in these scenarios. Finally, the lesions are either marked as benign or malignant, to define the labels.

TABLE 3

Semi-Supervised learning performance of the proposed multi-layered attention architectures on the benchmark datasets. The results reported were obtained by averaging 20 independent realizations.

| % Nodes (Train) | Baselines | | | GrAMME-Fusion | |
|---|---|---|---|---|---|
| | DeepWalk | DeepWalk-SG | GrAMME-SG | H = 1, K = 5 | H = 2, K = 5 |
| Vickers Dataset | | | | | |
| 10% | 94.60 | 95.55 | 98.94 | 99.21 | 99.21 |
| 20% | 95.26 | 95.83 | 98.94 | 99.21 | 99.21 |
| 30% | 96.10 | 96.19 | 98.94 | 99.21 | 99.21 |
| Congress Votes Dataset | | | | | |
| 10% | 98.82 | 98.00 | 96.02 | 100 | 100 |
| 20% | 99.90 | 99.10 | 96.87 | 100 | 100 |
| 30% | 99.91 | 99.63 | 97.33 | 100 | 100 |
| Leskovec-Ng Dataset | | | | | |
| 10% | 92.89 | 94.52 | 91.56 | 92.95 | 93.32 |
| 20% | 96.96 | 97.82 | 96.25 | 96.84 | 97.62 |
| 30% | 98.09 | 98.11 | 98.30 | 98.72 | 98.73 |
| Reinnovation Dataset | | | | | |
| 10% | 69.26 | 67.23 | 76.42 | 74.41 | 75.28 |
| 20% | 72.12 | 70.61 | 80.72 | 79.61 | 79.00 |
| 30% | 73.46 | 70.55 | 83.16 | 81.97 | 80.95 |
| Mammography Dataset | | | | | |
| 10% | 73.30 | 71.65 | 82.27 | 82.57 | 82.63 |
| 20% | 69.86 | 70.68 | 83.01 | 83.20 | 83.28 |
| 30% | 77.21 | 77.04 | 83.06 | 83.74 | 83.75 |
| Balance Scale Dataset | | | | | |
| 10% | 81.80 | 81.39 | 77.67 | 80.13 | 80.15 |
| 20% | 86.48 | 85.69 | 78.67 | 86.5 | 86.58 |
| 30% | 89.19 | 86.41 | 79.10 | 87.84 | 88.72 |

Balance Scale: The final dataset considered is the UCI Balance scale dataset, which summarizes the results from a psychological experiment. Using 4 different attributes characterizing the subject, namely left weight, the left distance, the right weight, and the right distance, a 4-layered graph was constructed. Each subject (or node) is classified as having the balance scale tip to the right, tip to the left, or be balanced.

Baselines

The two following baselines were used in order to compare the performance of the proposed approaches. Given that the datasets considered do not contain specific node attributes to perform feature learning, the natural approach is to obtain embeddings for each node in every layer, using deep network embedding techniques, and to subsequently build a classifier model using the resulting features. Following recent approaches, DeepWalk was used; a state-of-the-art embedding technique for obtaining deep embeddings. In particular, two different variants were considered: (i) Deep-Walk: Each layer is treated in the multi-layered graph as independent, and embeddings are obtained from the layers separately. Finally, the embeddings are concatenated for each node from the different layers and build a multi-layer perceptron to perform the classification; (ii) DeepWalk-SG: a supra graph is constructed by introducing virtual edges between nodes across layers as described herein and perform DeepWalk on the supra graph. Finally, the embeddings are concatenated as in the previous case and the classifier is designed. Though the former approach does not exploit the inter-layer information, in cases where there is significant variability in neighborhood structure across layers, it can still be effective by treating the layers independently.

Experiment Setup

In this section, the experiment setup will be described in detail. For both of the proposed approaches, architectures with T=2 graph (weighted) attention layers were considered with the input feature dimension fixed at D=64. The number of hidden dimensions for both the attention layers was fixed at 32. The experiments were run in a transductive learning setting. As described earlier, the present begins by first creating random node attributes of dimension D=64 in every layer. For the GrAMME-SG architecture, H=2 attention heads and a single fusion head were used. On the other hand, in the GrAMME-Fusion approach, H=1 (no fusion head) and H=2 (one fusion head) was used for each of the layers in the graph. Furthermore, in the supra fusion layer, the experiment used K=5 fusion heads. All networks were trained with the Adam optimizer, with the learning rate fixed at 0.001. In order to study the sensitivity of the proposed approaches over varying levels of training data availability, the percentage of train nodes were varied from 10% to 30%. The experiments were repeated over 20 independent realizations of train-test split and the average performance in all cases was reported. The performance of the algorithms was measured using the overall accuracy score. The DeepWalk algorithm was run with the number of walks fixed at 40, and the embedding sizes were fixed at 8 and 32 respectively for the two baselines.

Results

Figures 3A, 3B, 3C:
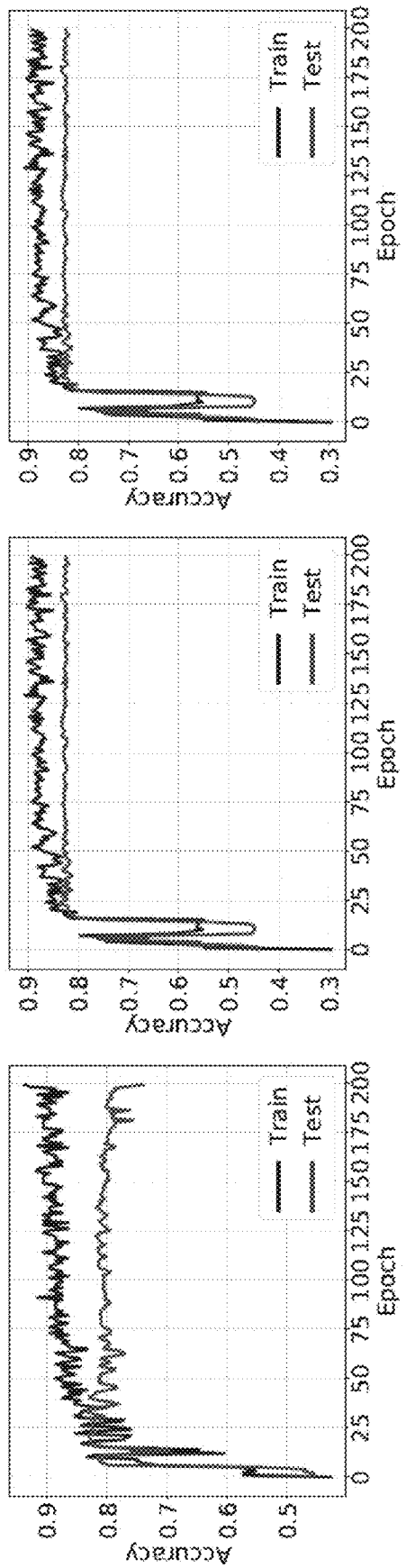
FIGS. 3A-3C are graphical representations of convergence characteristics of the proposed GrAMME-Fusion architecture with the parameters T=2; H=1 and K=5, respectively.
Figures 4A, 4B, 4C, 4D:
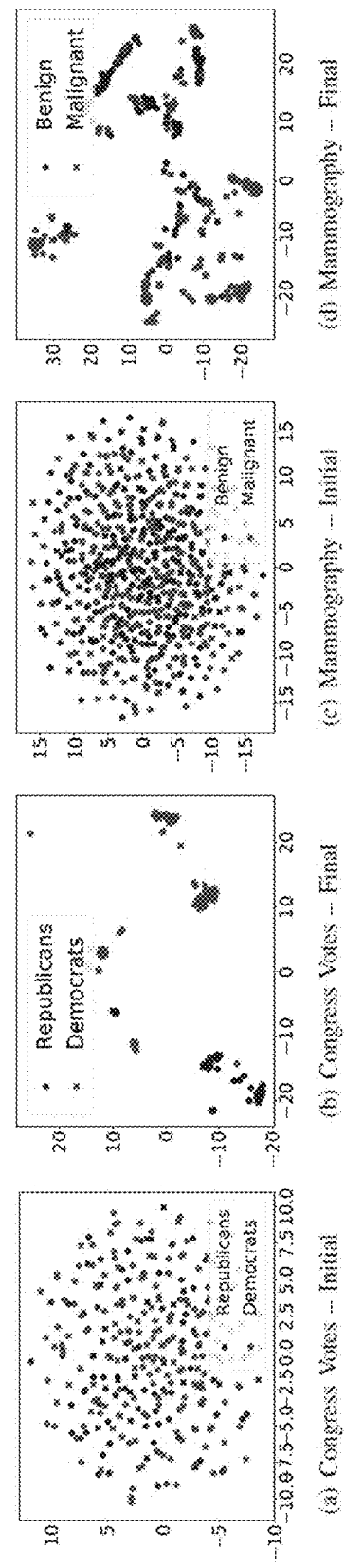
FIGS. 4A-4D are graphical representations of the embeddings for two different datasets, obtained using the GrAMME-Fusion architecture with parameters T=2, H=1 and K=5, respectively.

Table 3 summarizes the performance of the present approaches on the 6 multi-layered graph datasets, along with the baseline results. As described above increasing the number of attention heads in GrAMME-SG increases the computational complexity. However, GrAMME-Fusion is computationally efficient, since it employs multiple fusion heads (supra fusion layer), while simplifying the layer-wise attention models. In fact, results obtained by using a single attention head in each layer are reported. FIGS. 3A-3C illustrates the convergence characteristics of the proposed GrAMME-Fusion architecture under different training settings for the Mammography dataset. As it can be observed, even with the complex graph structure (around 2 million edges), the proposed solutions demonstrate good convergence characteristics.

From the reported results, the following observations were made: In most datasets, the proposed attention-based approaches significantly outperformed the baseline techniques, providing highly robust models even when the training size was fixed at 10%. In particular, with challenging datasets such as Reinnovation and Mammography datasets, the proposed approaches achieve improvements of 7%-13% over network embedding techniques. This clearly demonstrates the effectiveness of both the use of attention-based feature learning, and random features in multi-layer graph analysis. The Balance Scale dataset is a representative example for scenarios where the neighborhood structure varies significantly across layers, and consequently the baseline Deep Walk approach perform competitively with the GrAMME approaches that take inter-layer dependencies into account. When comparing the two proposed approaches, though GrAMME-SG provides improved flexibility by allowing information flow between all layers, GrAMME-Fusion consistently outperforms the former approach, while also being significantly cheaper. Interestingly, with GrAMME-Fusion, increasing the number of attention heads H does not lead to significant performance improvements, demonstrating the effectiveness of the supra fusion layer.

Finally, the multi-layered graph embeddings were visualized to qualitatively understand the behavior of the feature learning approaches. More specifically, the two-dimensional t-SNE visualizations of the hidden representations for Congress Votes and Mammography datasets are shown, obtained using GrAMME-Fusion. FIGS. 4A-4D show that initial random features and the learned representations, wherein the effectiveness of the attention mechanism in revealing the class structure is clearly evident.

Computing System

Figure 5:
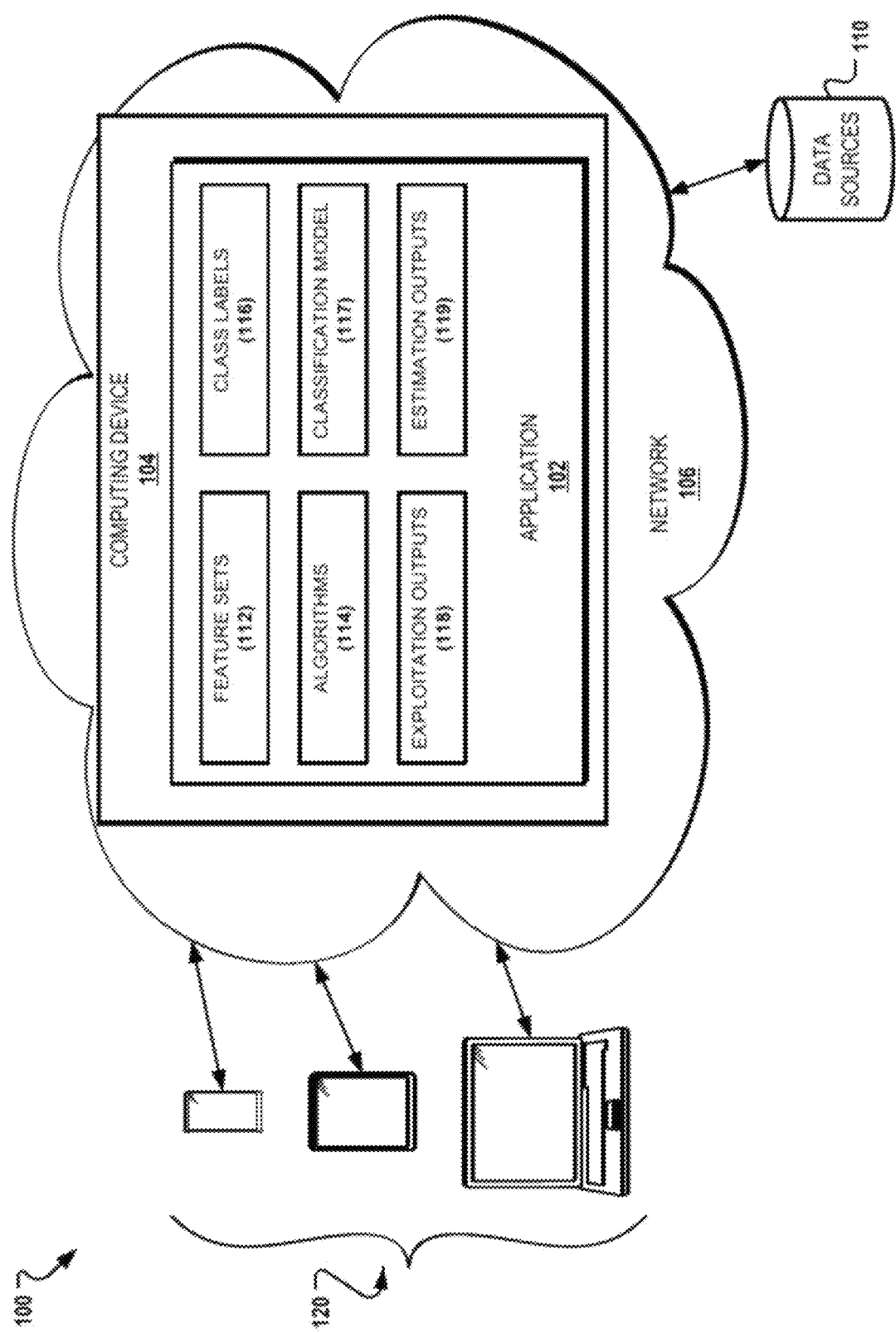
FIG. 5 is a simplified block diagram showing an exemplary computer system for graph attention models of multi-layered embeddings and deep learning applications.

FIG. 5 illustrates an example of a suitable computing system 100 used to implement various aspects of the present system and methods for graph attention models of multi-layered embeddings and deep learning applications. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 112. Such modules 112 are hardware-implemented, and thus include at least one tangible unit capable of performing certain operations and may be configured or arranged in a certain manner. For example, a hardware-implemented module 112 may comprise dedicated circuitry that is permanently configured (e.g., as a special-purpose processor, such as a field-programmable gate array (FPGA) or an application-specific integrated circuit (ASIC)) to perform certain operations. A hardware-implemented module 112 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 112 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 112 are temporarily configured (e.g., programmed), each of the hardware-implemented modules 112 need not be configured or instantiated at any one instance in time. For example, where the hardware-implemented modules 112 comprise a general-purpose processor configured using software, the general-purpose processor may be configured as respective different hardware-implemented modules 112 at different times. Software may accordingly configure a processor 102, for example, to constitute a particular hardware-implemented module at one instance of time and to constitute a different hardware-implemented module 112 at a different instance of time.

Hardware-implemented modules 112 may provide information to, and/or receive information from, other hardware-implemented modules 112. Accordingly, the described hardware-implemented modules 112 may be regarded as being communicatively coupled. Where multiple of such hardware-implemented modules 112 exist contemporaneously, communications may be achieved through signal transmission (e.g., over appropriate circuits and buses) that connect the hardware-implemented modules. In embodiments in which multiple hardware-implemented modules 112 are configured or instantiated at different times, communications between such hardware-implemented modules may be achieved, for example, through the storage and retrieval of information in memory structures to which the multiple hardware-implemented modules 112 have access. For example, one hardware-implemented module 112 may perform an operation, and may store the output of that operation in a memory device to which it is communicatively coupled. A further hardware-implemented module 112 may then, at a later time, access the memory device to retrieve and process the stored output. Hardware-implemented modules 112 may also initiate communications with input or output devices.

As illustrated, the computing system 100 may be a general purpose computing device, although it is contemplated that the computing system 100 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 102, a main memory 104 (e.g., a system memory), and a system bus 101 that couples various system components of the general purpose computing device to the processor 102. The system bus 101 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 100 may further include a variety of computer-readable media 107 that includes removable/non-removable media and volatile/nonvolatile media, but excludes transitory propagated signals. Computer-readable media 107 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 104 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 102. For example, in one embodiment, data storage 106 holds an operating system, application programs, and other program modules and program data.

Data storage 106 may also include other removable/non-removable, volatile/nonvolatile computer storage media. For example, data storage 106 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 100.

A user may enter commands and information through a user interface 140 or other input devices 145 such as a tablet, electronic digitizer, a microphone, keyboard, and/or pointing device, commonly referred to as mouse, trackball or touch pad. Other input devices 145 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 145 are often connected to the processor 102 through a user interface 140 that is coupled to the system bus 101, but may be connected by other interface and bus structures, such as a parallel port, game port or a universal serial bus (USB). A monitor 160 or other type of display device is also connected to the system bus 101 via user interface 140, such as a video interface. The monitor 160 may also be integrated with a touch-screen panel or the like.

The general purpose computing device may operate in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 103. In such embodiments, a modem or other means for establishing communications over the network is connected to the system bus 101 via the network interface 103 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method, comprising:
providing a multi-layered graph having a plurality of graph layers, each of the plurality of graph layers including a plurality of nodes;
constructing a graph-layer-specific latent feature vector for each of the plurality of nodes using a graph-layer-specific attention model;
inferring dependencies between nodes of the plurality of nodes by processing all sets of graph-layer-specific features using a supra-fusion layer, wherein the supra-fusion layer comprises a plurality of fusion heads;
obtaining a consensus representation from each of the plurality of fusion heads using an overall fusion head, wherein each of the plurality of fusion heads of the supra-fusion layer performs a weighted combination of the graph-layer-specific latent feature vectors for a node from each of a plurality of graph-layer-specific attention heads, and wherein each of the plurality of fusion heads comprises a scaling factor associated with each of the plurality of graph-layer-specific attention heads, wherein each of the scaling factors are shared across each of the plurality of nodes; and
characterizing each node of the plurality of nodes by aggregating layer-specific node features associated with one node of the plurality of nodes across each of a plurality of attention layers.

2. The method of claim 1, further comprising:
generating a set of random attributes for every node in the graph layer using random initialization.

3. The method of claim 1, wherein the graph-layer-specific attention model is restricted to a single graph layer.

4. The method of claim 1, further comprising:
processing each output of the supra-fusion layer using a feed-forward layer.

* * * * *